United States Patent Office 3,501,504
Patented Mar. 17, 1970

3,501,504
1-METHYLEN-5α-ANDROSTAN-17-ONE AND DERIVATIVES THEREOF
Paul D. Klimstra, Northbrook, Ill., assignor to G. D. Searle & Co., Chicago, Ill., a corporation of Delaware
No Drawing. Filed Feb. 23, 1968, Ser. No. 707,464
Int. Cl. C07c *169/20, 167/14;* A61k *17/06*
U.S. Cl. 260—397.3      10 Claims

ABSTRACT OF THE DISCLOSURE

Novel steroidal derivatives of the androstane family characterized by a 1-methylene and a 17-oxygenated substituent and useful as pharmacological agents as is evidenced by their anabolic, androgenic and anti-estrogenic properties.

---

The present invention is concerned with novel steroidal derivatives containing a 1-methylene and a 17-oxygenated substituent and, more particularly, with 1-methylen-5α-androstan-17-one and related derivatives characterized by the following structural formula

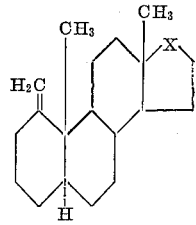

wherein X is a carbonyl group or a radical of the formula

Y being hydrogen or a lower alkanoyl radical and Z being a lower aliphatic hydrocarbon radical.

The lower aliphatic hydrocarbon radicals denoted by Z are typified by lower alkyl groups such as methyl, ethyl, propyl, butyl, pentyl, hexyl and heptyl, lower alkenyl groups such as vinyl, propenyl, butenyl, pentenyl, hexenyl and heptenyl, and lower alkynyl groups such as ethynyl, propynyl, butynyl, pentynyl, hexynyl and heptynyl together with the corresponding branched-chain isomers.

The compounds of the present invention are conveniently manufactured by dehydration of the corresponding 1α-hydroxy-1β-methyl starting materials encompassed by the following structural formula

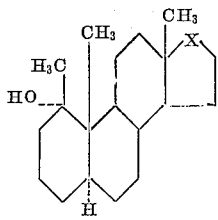

wherein X is as hereinbefore defined. Those starting materials and methods for their manufacture are described in my copending application Ser. No. 620,616, filed Mar. 6, 1967. A particularly suitable dehydrating medium contains a lower alkanoic acid anhydride and p-toluenesulfonic acid. When acetic anhydride, p-toluenesulfonic acid and 1α-hydroxy-1β-methyl-5α-androstan-17-one are heated in benzene, the instant 1-methylen-5α-androstan-17-one is produced. When the starting material is 1β-methyl-5α-androstane-1α,17β-diol, concomitant esterification of the 17-hydroxy group occurs, thus affording, in the case of acetic anhydride, 1-methylen-5α-androstan-17β-ol 17-acetate. Removal of the ester function is conveniently effected by alkaline hydrolysis, in the case of the latter acetate resulting in 1-methylen-5α-androstan-17β-ol.

Reaction of the instant 17-keto compound with the appropriate organometallic reagent affords the corresponding 17α-(lower aliphatic hydrocarbon)-17β-ols. The use of methyl magnesium bromide thus provides 17α-methyl-1-methylen-5α-androstan-17β-ol, while the lithium acetylide reagent affords 17α-ethynyl-1-methylen-5α-androstan-17β-ol.

An alternate procedure for the manufacture of the instant 17α-(lower alkynyl) derivatives involves partial catalytic hydrogenation of the corresponding 17α-(lower alkynyl) substances. 17α-ethynyl-1-methylen-5α-androstan-17β-ol in pyridine is thus shaken with hydrogen and 5% palladium-on-carbon catalyst to yield 1-methylene-17α-vinyl-5α-androstan-17β-ol.

The compounds of this invention are useful as a result of their valuable pharmacological properties. They possess, for example, hormonal and antihormonal activity, as is evidenced by their anabolic, androgenic and anti-estrogenic properties. These compounds can be administered in any of a number of conventional pharmaceutical forms and also by conventional routes. For oral administration suitable solid forms are pills, powders, capsules, tablets and the like and suitable liquid forms are syrups, emulsions, elixers, suspensions and the like. For parenteral administration these compounds can be dispersed in an aqueous suspension or dissolved in a pharmacologically acceptable oil or oil-water emulsion. Suitable excipients can also be added.

The pharmacological activity of the novel compounds of this invention is specifically illustrated by the anabolic and androgenic activity of 1-methylen-5α-androstan-17β-ol 17-acetate, 1-methylen-5α-androstan-17β-ol and 17α-methyl-1-methylen-5α-androstan-17β-ol when administered intramuscularly to rats at doses ranging from 2 to 5 mg.

The specific assay used for determination of anabolic and androgenic activity is that originally described by Eisenberg and Gordan, J. Pharm. Exp. Therap., 99, 38 (1950) as modified by Saunders and Drill, Proc. Soc. Exper. Biol. and Med., 94, 646 (1957) and is described as follows:

Corn oil solutions or suspensions of the test compound are administered intramuscularly, daily for a period of 7 days, to a group of castrated immature male rats. On the day after the last injection the animals are sacrificed and the seminal vesicles, ventral prostate glands and levator ani muscles are removed, dissected free of extraneous tissue and weighed. Those weights are compared with the corresponding weights of organs taken from control animals, treated in the same manner save for omission of the test compound. The increases in weights of the seminal vesicles and ventral prostate glands are used as a measure of androgenicity and increases in levator ani muscle weights serve as an index of anabolic activity. A compound is rated active if it produces an increase in organ weights statistically significant at a probability level of <0.01.

The invention will appear more fully from the examples which follow. These examples are set forth by way of illustration only and it will be understood that the invention is not to be construed as limited thereby either in spirit or in scope as many modifications both in materials and methods will be apparent from this disclosure to those skilled in the art. In these examples temperatures are given in degrees centrigrade (° C.). Quantities of materials are expressed in parts by weight unless otherwise noted.

EXAMPLE 1

To a stirred solution containing 125 parts by volume of 3 M ethereal methyl magnesium bromide dissolved in 90 parts of tetrahydrofuran is added a solution of 5 parts of 17β-hydroxy-5α-androstan-1-one in 90 parts of tetrahydrofuran. The ether is removed by distillation and the residual reaction mixture is heated at the reflux temperature for about 16 hours, then is cooled and poured carefully into a mixture of saturated aqueous ammonium chloride and ice. Extraction of that aqueous mixture with ether affords an organic extract, which is washed several times with water, then dried over anhydrous sodium sulfate containing decolorizing carbon. Distillation of the solvent under reduced pressure affords the solid crude product, which is purified by recrystallization from aqueous methanol to yield 1β-methyl-5α-androstane-1α,17β-diol, melting at about 178–180°. It is further characterized by an optical rotation, in chloroform, of +31°.

EXAMPLE 2

To a solution of 2 parts of 1β-methyl-5α-androstane-1α,17β-diol in 20 parts of acetone is added dropwise an aqueous solution, 8 N in chromium trioxide and 8 N in sulfuric acid until the oxidant is present in excess. A small quantity of isopropyl alcohol is added at that point in order to destroy the excess reagent. The resulting mixture is poured into ice and water and the precipitated crude product is collected by filtration, washed with water, then dried in air. Recrystallization of that crude product from methanol containing decolorizing carbon results in pure 1α-hydroxy-1β-methyl-5α-androstan-17-one, melting at about 195–197°. It exhibits an optical rotation, in chloroform, of +111°.

EXAMPLE 3

A solution containing one part of 1β-methyl-5α-androstane-1α,17β-diol, 10 parts of acetic anhydride and 20 parts of pyridine is stored at room temperature for about 16 hours, then is cooled and poured carefully into a large volume of water. Extraction of that aqueous mixture with benzene affords an organic solution, which is dried over anhydrous magnesium sulfate and concentrated to dryness under reduced pressure, thus affording 1β-methyl-5α-androstane-1α,17β-diol 17-acetate.

EXAMPLE 4

The substitution of an equivalent quantity of propionic anhydride in the procedure of Example 3 results in 1β-methyl-5α-androstane-1β,17α-diol 17-propionate.

EXAMPLE 5

To a solution of 4.8 parts of 1α-hydroxy-1β-methyl-5α-androstan-17-one in 222 parts of benzene is added 3 parts of acetic anhydride and 4 parts of p-toluenesulfonic acid monohydrate and that reaction mixture is heated at the reflux temperature for about 10 minutes. The mixture is then cooled to room temperature and diluted with approximately 20 parts of water with vigorous stirring. The organic layer is separated, then stirred with 8 parts of potassium carbonate and filtered. Evaporation of the solvent under reduced pressure affords 1-methylen-5α-androstan-17-one as an oil. This compound exhibits infrared absorption maxima, in chloroform, at about 3.41, 5.76 and 6.10 microns. It is represented by the following structural formula

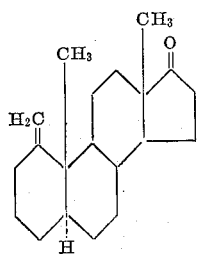

EXAMPLE 6

To a solution of 1 part of 1β-methyl-5α-androstane-1α,17β-diol in 110 parts of benzene is added 2 parts of acetic anhydride and 1.1 parts of p-toluenesulfonic acid monohydrate and the resulting mixture is heated at the reflux temperature for about 10 minutes, then is cooled. At that time, 5 parts of potassium carbonate is added and the mixture is stirred at room temperature for about 10 minutes, then filtered. Evaporation of the filtrate to dryness affords an oily residue, which is purified by chromatography on a silica gel column followed by elution with benzene. The oily pure product thus obtained is 1-methylen-5α-androstan-17β-ol 17-acetate, which is characterized by infrared absorption maxima, in chloroform, at about 3.40, 5.77, 6.10, 7.26, 7.92 and 9.70 microns. It is represented by the following structural formula

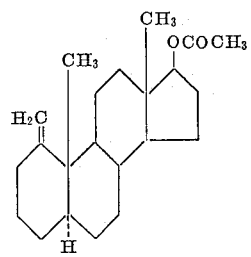

EXAMPLE 7

When an equivalent quantity of propionic anhydride is substituted for acetic anhydride in the procedure in Example 6, there is produced 1-methylen-5α-androstan-17β-ol 17-propionate.

EXAMPLE 8

To a solution of 3.5 parts of 1-methylen-5α-androstan-17β-ol 17-acetate in 200 parts of methanol is added a solution of 5 parts of potassium hydroxide in 50 parts of water and that mixture is heated at the reflux temperature for about 45 minutes. The mixture is then diluted with water and the resulting aqueous mixture is extracted with ether. That organic extract is separated, washed several times with water, dried over anhydrous sodium sulfate and concentrated under reduced pressure to afford a glass-like residue. Purification of that material by crystallization from hexane affords white needle-like crystals of 1-methylen-5α-androstan-17β-ol, melting at about 112–114°. This compound is represented by the following structural formula

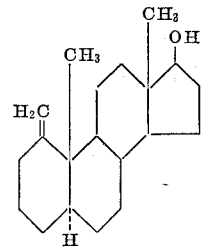

EXAMPLE 9

To 25 parts by volume of 3 M ethereal methyl magnesium bromide is added a solution of 1.1 parts of 1-methylen-5α-androstan-17-one in 52.5 parts of ether and the resulting solution is heated at the reflux temperature for about 4 hours, then is cooled and poured into excess saturated aqueous ammonium chloride. The layers are separated and the aqueous layer is made acidic by the addition of dilute hydrochloric acid, then is extracted with ether. The ether solutions are combined, then washed successively with water and 5% aqueous sodium bicarbonate, dried over anhydrous sodium sulfate and concentrated under reduced pressure to afford an oily residue. That residue is purified by chromatography on silica gel followed by elution of the column with benzene. The oily pure product thus obtained is 17α-methyl-1-methylen-5α-androstan-17β-ol, which exhibits infrared absorption maxima, in chloroform, at about 2.76, 3.42 and 6.20 microns. It is represented by the following structural formula

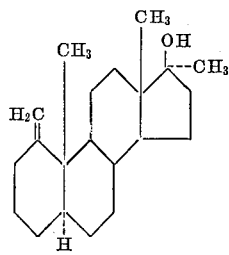

EXAMPLE 10

When an equivalent quantity of ethyl magnesium bromide is substituted in the procedure of Example 9 there is produced 17α-ethyl-1-methylen-5α-androstan-17β-ol.

EXAMPLE 11

To a solution of 2 parts of 1-methylen-5α-androstan-17-one in 67.5 parts of tetrahydrofuran is added, portionwise over a period of about 20 minutes, 6 parts of the 30% lithium acetylide-70% ethylene diamine complex, and the resulting reaction mixture is stirred at room temperature for about 4 hours, then is stored at room temperature for about 16 hours. That mixture is poured into saturated aqueous ammonium chloride, then is extracted with ether. The ether extract is separated, washed successively with dilute hydrochloric acid and dilute aqueous sodium bicarbonate, then dried over anhydrous sodium sulfate containing decolorizing carbon. Removal of the solvent by distillation under reduced pressure affords an oily residue which is purified by chromatography on a silica gel column followed by elution of the column with 2% ethyl acetate in benzene. The oily pure product thus obtained is 17α-ethynyl-1-methylen-5α-androstan-17β-ol, characterized by infrared absorption maxima, in chloroform, at about 2.75, 3.01, 3.40 and 6.11 microns. It is represented by the following structural formula

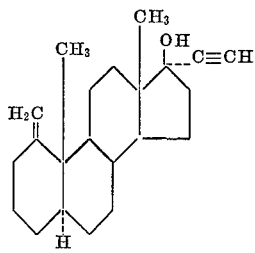

EXAMPLE 12

When an equivalent quantity of lithium propynylide is substituted in the procedure of Example 11, there is obtained 1-methylene-17α-propynyl-5α-androstan-17β-ol.

EXAMPLE 13

A mixture containing 1 part of 17α-ethynyl-1-methylen-5α-androstan-17β-ol, 0.1 part of 5% palladium-on-carbon catalyst and 50 parts of pyridine is shaken with hydrogen at atmospheric pressure and room temperature until one molecular equivalent of hydrogen is absorbed. The catalyst is removed by filtration and the filtrate is concentrated to dryness under reduced pressure to yield 1-methylene-17α-vinyl-5α-androstan-17β-ol.

EXAMPLE 14

The substitution of an equivalent quantity of 1-methylene-17α-propynyl-5α-androstan-17β-ol in the procedure of Example 13 results in 1-methylene-17α-propenyl-5α-androstan-17β-ol.

What is claimed is:
1. A compound of the formula

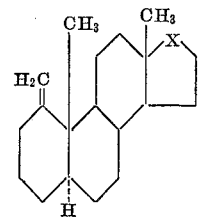

wherein X is selected from the group of radicals consisting of carbonyl and those of the formula

Z being hydrogen or a lower aliphatic hydrocarbon radical and Y being hydrogen or a lower alkanoyl radical.

2. As in claim 1, a compound of the formula

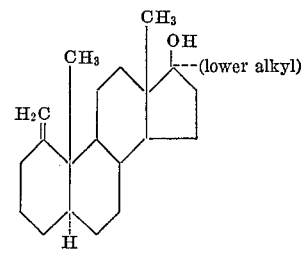

3. As in claim 1, a compound of the formula

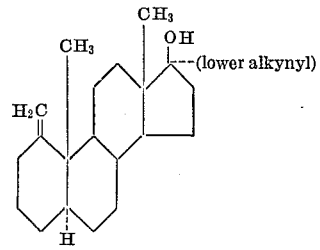

4. As in claim 1, a compound of the formula

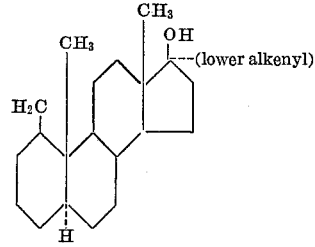

5. As in claim 1, a compound of the formula

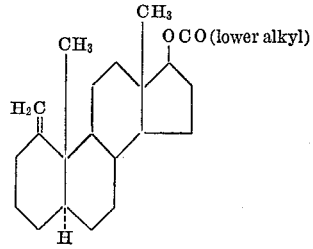

6. As in claim 1, the compound which is 1-methylen-5α-androstan-17β-ol 17-acetate.

7. As in claim 1, the compound which is 1-methylen-5α-androstan-17β-ol.

8. As in claim 1, the compound which is 1-methylen-5α-androstan-17-one.

9. As in claim 1, the compound which is 17α-methyl-1-methylen-5α-androstan-17β-ol.

10. As in claim 1, the compound which is 17α-ethynyl-1-methylen-5α-androstan-17β-ol.

References Cited
UNITED STATES PATENTS 3,134,769  5/1964  Camerino et al.

HENRY A. FRENCH, Primary Examiner

U.S. Cl. X.R.

260—397.5, 999

UNITED STATES PATENT OFFICE
CERTIFICATE OF CORRECTION

Patent No. 3,501,504      Dated March 17, 1970

Inventor(s) PAUL D. KLIMSTRA

It is certified that error appears in the above-identified patent and that said Letters Patent are hereby corrected as shown below:

Column 3, line 48    "androstane-1β,17α-diol" should be --androstane-1α,17β-diol--.

Column 6, Claim 4

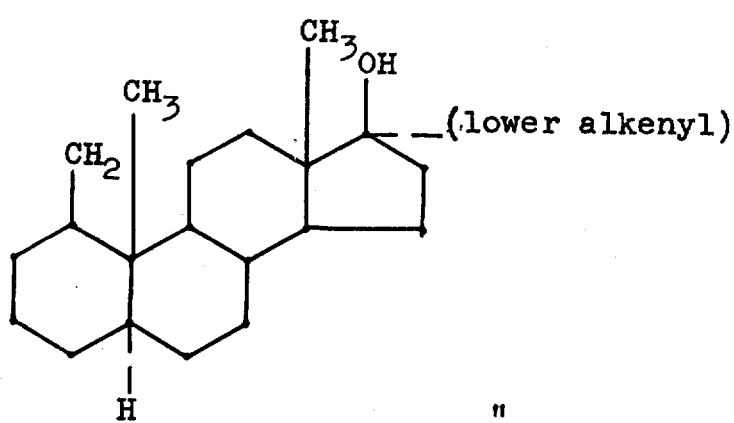

should be

PO-1050
(5/69)

UNITED STATES PATENT OFFICE
CERTIFICATE OF CORRECTION

Patent No. 3,501,504                     Dated March 17, 1970

Inventor(s)    PAUL D. KLIMSTRA

It is certified that error appears in the above-identified patent and that said Letters Patent are hereby corrected as shown below:

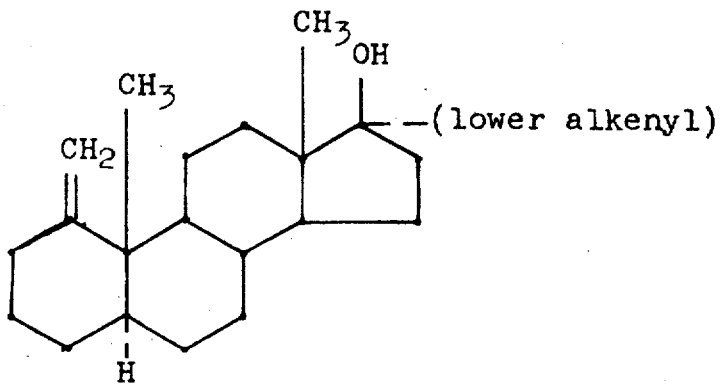

Signed and sealed this 11th day of August 1970.

(SEAL)
Attest:

EDWARD M. FLETCHER, JR.　　　　　　　WILLIAM E. SCHUYLER, JR.
Attesting Officer　　　　　　　　　　Commissioner of Patents